United States Patent [19]

Dancsik

[11] 4,226,433
[45] Oct. 7, 1980

[54] QUICK CHANGE TOOL HOLDER

[76] Inventor: Josef J. Dancsik, 37970 Pointe Rosa, Mt. Clemens, Mich. 48045

[21] Appl. No.: 15,328

[22] Filed: Feb. 26, 1979

[51] Int. Cl.³ .............................................. B23B 31/10
[52] U.S. Cl. ...................................... 279/51; 279/1 B
[58] Field of Search ........................... 279/51, 1 B, 52; 408/239

[56] References Cited

U.S. PATENT DOCUMENTS

| | | | |
|---|---|---|---|
| 2,345,069 | 3/1944 | Phillips | 279/51 |
| 2,460,302 | 2/1949 | Lundsten | 279/51 |
| 2,576,063 | 11/1951 | Berta | 279/1 B |
| 2,769,644 | 11/1956 | Denzler | 279/51 |
| 3,026,116 | 3/1962 | Makini, Sr. | 279/1 B |
| 3,365,204 | 1/1968 | Benjamin et al. | 279/51 |
| 3,496,638 | 2/1970 | Staunt | 279/51 X |
| 3,671,050 | 6/1972 | Andersson | 279/51 X |
| 3,679,220 | 7/1972 | Reeves | 279/1 B |
| 3,724,563 | 4/1973 | Wickham et al. | 279/1 B |
| 3,790,182 | 2/1974 | Schuman | 279/1 B X |

Primary Examiner—William R. Briggs
Attorney, Agent, or Firm—Basile, Weintraub & Hanlon

[57] ABSTRACT

A quick change tool holder is disclosed which allows tools to be changed while a collet holding the tools is rotating. The quick change tool holder comprises a stationary housing, a quill rotatably supported within the housing, a collet rotatingly engaged by the quill, the collet adapted to releasingly engage a tool. A rotatable sleeve threadingly engages the housing, and rotation of the sleeve in a first direction releases a tool held in the collet for removal of the tool while the collet is rotating. Rotation of the sleeve in a second direction engages the shank of a tool that has been placed within the collet for rotation therewith. The removal or insertion of a tool can be made while the collet is rotating.

2 Claims, 2 Drawing Figures

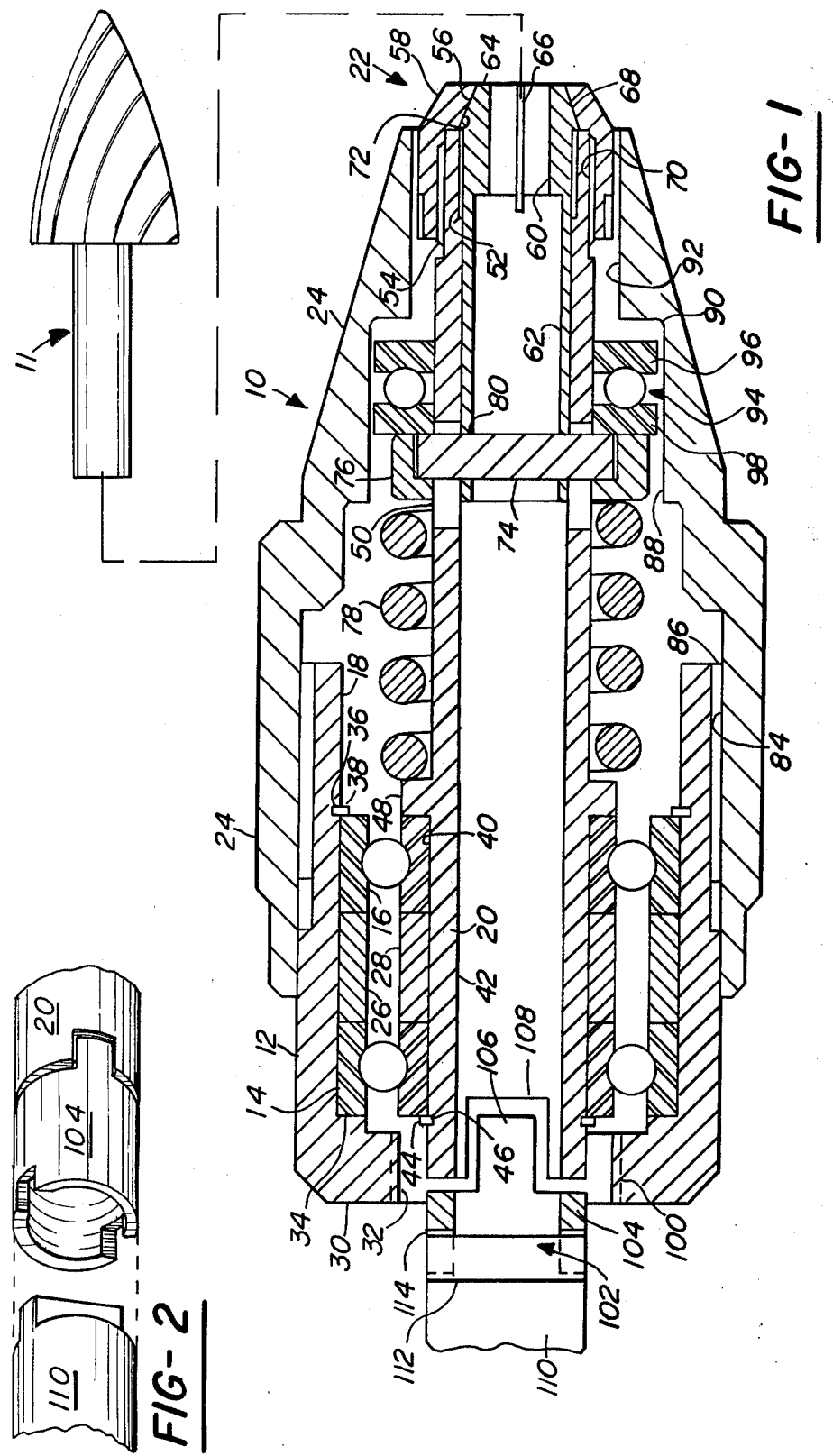

QUICK CHANGE TOOL HOLDER

BACKGROUND OF THE INVENTION

I. Field of the Invention

The present invention relates to the field of tool holders, and particularly to the field of tool holders of the collet type. More particularly the present invention relates to the field of quick change tool holders of the collet type which allow tools to be changed while the collet is rotating.

II. Prior Art Statement

Quick change tool holders of the collet type have long been known. Presently used collet tool holders require that the collet be stationary and a pair of wrenches be employed to loosen the collet and remove the tool. The wrenches must again be used to retighten the collet once a replacement tool has been installed. The applicant knows of no quick change tool holders of the collet type wherein a tool can be removed from a collet and replaced by another tool while the collet is rotating.

SUMMARY OF THE INVENTION

The present invention comprises a housing fixedly attached to a shaft support for a rotating tool drive of a machine tool. A pair of spaced apart bearings within the housing rotatably support a quill. The quill is rotatably driven by the machine tool drive at an inner end. An outer end of the quill rotatably supports a collet.

The collet comprises an outer member which threadingly engages an outer end of the quill, and an inner member which is slidingly supported in a central bore of the quill. The inner member comprises a central tool engaging bore comprising a plurality of segments formed by a plurality of longitudinal slits extending longitudinally from an outer end of the inner member extending inward and terminating a distance short of an inner end of the inner member. The segments are biased radially outward forming an enlarged tool engaging diameter when in a disengaged position. The segments include a tapered outer end. The outer member has a tapered bore at its outer end which is complimentary to the tapered outer end of the segments. When the tapered bore and the tapered outer end are in abutment, a longitudinal motion of the inner member relative to the outer member causes the segments to open and close the collet and engage and disengage a tool. A spring supported within the quill causes the inner member to be spring loaded toward the outer member so that the collet has a normally tool engaged or closed position.

An outer sleeve threadingly engages the housing and rotation of the sleeve causes longitudinal motion of the sleeve relative to the quill. A thrust bearing interposed between a shoulder of the sleeve and a spring seat, cooperate to form a device for moving the collet from a tool engaging position to a tool releasing position. Rotation of the sleeve in a first direction releases the tool from engagement with the collet; and rotation of the sleeve in a second direction engages the collet with the tool.

For a more complete understanding of the present invention reference is made to the following detailed description and accompanying drawing.

Other advantages and applications of the present invention will become apparent to those skilled in the field to which this invention pertains, when the accompanying description of the best mode contemplated from practicing the invention are read in conjunction with the accompanying drawing.

BRIEF DESCRIPTION OF THE DRAWING

In the drawing like reference numbers refer to like parts throughout the several views, and wherein:

FIG. 1, illustrates a cross sectional view of the quick change tool holder of the present invention; and FIG. 2 illustrates a perspective view of the coupling shaft.

DESCRIPTION OF THE PREFERRED EMBODIMENT

Referring now to the drawing wherein there is illustrated at 10 a cross sectional view of the quick change tool holder of the present invention comprising: a stationary housing 12; a pair of spaced apart bearings 14 and 16; supported in a bore 18 of the housing 12. The spaced apart bearings 14 and 16 rotatably support a quill 20. The quill 20 rotatably supports at an outer end a collet 22 adapted to releasably engage a tool 11 for rotation therewith.

A sleeve 24 threadingly engages the housing 12 for longitudinal movement there along. Rotation of the sleeve 24 in a first direction opens the collet 22 to release the tool from the collet. Rotation of the sleeve 24 in a second direction allows the collet 22 to close and engage a shank of the tool for rotation with the collet in a manner which will be described more fully hereinbelow.

The housing comprises a generally tubular shaped member having an inner end, an outer end, and the central bore 18 beginning at the outer end. The central bore terminates at a bottom wall 30 and a threaded through bore 32 of reduced diameter through the bottom wall forms a shoulder 34. The pair of spaced apart bearings 14 and 16 are spaced by a pair of spacers 26, 28 and they engage the central bore 18. The first bearing 14 has its outer race abutting the shoulder 34 at an inner end. A groove 36 in the bore 18 engages a retaining ring 38. The retaining ring 38 abuts an outer end of the second bearing 16 outer race to retain the pair of spaced apart bearings 14 and 16 within the bore 18.

The quill 20 comprises a tubular member including an inner end, an outer end, an outer diameter 40, and a longitudinal bore 42. The outer diameter 40 engages a bore of the spaced apart bearings 14 and 16. A retaining ring 44 abuts an inner end of an inner race of the first bearing 14 and a groove 46 in the outer diameter 40 spaced in from the inner end of the quill a distance engages the retaining ring 44 holding the retaining ring in place. A raised diameter shoulder 48 integral with the quill 20 has an inner wall abutting the inner race of the second bearing 16 to longitudinally position the quill within the housing 12. A transverse slot 50 spaced longitudinally toward the outer end of the quill from the raised diameter shoulder 48, extends across the quill and then longitudinally a distance. The quill 20 has an enlarged bore 52 extending longitudinally inward a distance from the outer end thereof, and a threaded portion 54 along the outer diameter of the quill extending inward a distance from the outer end.

The collet 22 comprises an inner member 56 slidingly supported within the bore 42 and an outer member 58 threadingly engaging the threaded portion 54 of the quill. The inner member 56 has a central tool engaging bore 60 extending inward from an outer end thereof. An enlarged bore 62 extends longitudinally from an inner end of the inner member 56 terminating at the tool engaging bore 60. The tool engaging bore 60 is formed by one or more segments 64 formed by a plurality of longitudinal slits 66 extending form the outer end of the inner member along the tool engaging diameter and along the enlarged diameter a distance terminating short of the inner end of the inner member 56. The segments 64 are biased radially outward to form an enlarged tool engaging bore in their relaxed state. The enlarged bore 52 provides clearance for the segments 64 to move radially outward. The segments 64 include a tapered outer end 68. The collet outer member 58 comprises a threaded bore 70 extending along the inner end thereof to threadingly engage the quill threaded portion 54. A tapered bore 72, of reduced diameter, at the outer end of the outer member 58 is complimentary to the tapered outer end 68 of the inner member 56, and longitudinal movement of the inner member toward the outer end engages the tapered outer end of the segments 68 with the tapered bore 72 biasing the segments to a tool engaging diameter to fixedly engage a shank of the tool.

A cross-pin 74 slidingly engages the transverse slot 50, and a pair of aligned apertures 80 across an inner end of the collet inner member 56 and extends radially past the outer diameter 40 of the quill 20 a distance.

A spring seat 76 comprises an inner diameter slidingly engaging the quill outer diameter 40, and a pair of radially opposed slots along an outer end thereof to nestingly receive and retain the cross-pin 74. The spring seat has an outer diameter which envelopes the cross-pin 74 to radially retain the cross-pin.

An inner end of the spring seat engages an outer end of a spring 78. The spring slidingly envelopes the quill outer diameter 40 and an inner end of the spring 78 abuts an outer face of the raised diameter shoulder 48. The outer end of the spring 78 is biased against the inner end of the spring sheet 76.

The collect inner member 56 is slidingly supported by the longitudinal bore 42. The spring biasing force is transmitted to the spring seat 76 and the cross-pin 74 and then to the collet inner member 56, which biases the inner member 56 against the tapered bore 68, biasing the segments 64 and the tool engaging diameter 60 radially inward to engage the shank of the tool.

The outer sleeve 24 has a threaded bore 84 which threadingly engages a threaded diameter 86 of the housing 12. Rotation of the sleeve 24 relative to the housing 12 produces longitudinal motion of the sleeve 24 along the housing 12. The rotation of the sleeve 24 relative to the housing 12 engages and disengages the tool and the collet in a manner to be described more fully hereinbelow.

The sleeve 24 has a central bore 88 which terminates in a sleeve shoulder 90 near an outer end of the sleeve. A sleeve through bore 92 exceeds the outer diameter of the collet 22 to allow the collet to rotate freely within the bore 92.

A thrust bearing 94 including a stationary race 96 and a rotatable race 98 is slidingly supported by the quill outer diameter 40 and interposed between the cross-pin 74 and the shoulder 90. Rotation of the sleeve 24 in a first direction engages the sleeve shoulder 90 with the stationary race 96 moving the thrust bearing 94 longitudinally inward abutting the rotating race 98 with the pin 75 which compresses the spring 78 allowing a longitudinally inward movement of the collet inner member 56. The longitudinally inward movement of the inner member 56 releases the segments 64 which are in abutment with the tapered bore 72 allowing a radially outward movement of the segments 64 and the tool engaging diameter 60 to release the tool. Rotation of the sleeve 24 in a second direction disengages the sleeve shoulder from the thrust bearing allowing the spring force to urge the pin, the tube, and the inner member longitudinally outward urging the segments in the tool engaging diameter radially inward to engage the tool.

The threaded bore 32 is used to threadingly engage a machine support member and then align the quick change tool holder 10 with a drive means 102. The drive means 102 comprises a coupling shaft 104 (FIG. 2) having a tang 106 which engages a slot 108 at the inner end of the quill 20 to rotate the quill. A drive shaft 110 has a tang 112 extending across an outer end thereof which slidingly engages a slot 114 across an inner end of the coupling 104. The slot 114 is displaced ninety degrees from the tang 106. The tangs 106 and 112 and the slots 108 and 114 cooperate with the coupling forming a universal connection between the drive shaft 110 and the quill 20. This accommodates any misalignment between the drive shaft and the quill.

From the foregoing the skilled artisan can perceive that the present invention provides a quick change tool holder which can be attached to the quill support of a machine tool such as a drill press or milling machine, and the machine tool can rotatingly drive the quill of the present invention. While the quill is rotating a rotation of the sleeve 24 in a first direction opens the collet 22 allowing the shank of the tool to be disengaged or inserted and rotation of the sleeve 24 in a second direction closes the collet 22 engaging the shank of a tool with the collet and rotating quill. The engagement of a tool in the quill or the removal of a tool from the quill is performed with the sleeve 14 and housing 12 essentially stationary. The present invention can be employed to engage or disengage the tool from the collet with the quill stationary or rotating.

Having thus described the invention what is claimed is:

1. A quick change tool holder comprising:
   a stationary housing;
   a quill rotatably supported by the housing;
   a collet rotatingly engaged by the quill;
   the collet adapted to releasingly engage a tool while rotating;
   the housing comprising an inner end and an outer end, a central bore beginning at the outer end, said bore terminating at a bottom wall, a through bore of reduced diameter through the bottom wall forming a shoulder;
   a pair of spaced apart bearings held in spaced relationship by a sleeve, supported by the central bore, a first bearing outer race abutting the shoulder at an inner end, a retaining ring abutting a second bearing outer race at an outer end, said retaining ring engaging a groove in the central bore to longitudinally position said spaced apart bearings within the housing;
   the quill comprising a tubular member including an inner end, an outer end, an outer diameter and a longitudinal bore, said outer diameter engaging a bore of the spaced apart bearings, a retaining ring abutting an inner end of an inner race of said first bearing, a groove in the outer diameter spaced from the inner end thereof to engage said retaining ring, a raised diameter shoulder integral with the tubular member, an inner wall of the raised diameter shoulder engaging an outer end of an inner race of said second bearing to longitudinally position the quill, a transverse slot spaced longitudinally toward the outer end from the raised diameter shoulder, an enlarged bore at the outer end of said quill, and a threaded portion along the outer diameter of the quill extending inward a distance from the outer end;

the collet comprising an inner member and an outer member, the inner member having a diameter slidingly engagable with the longitudinal bore, a tool engaging bore extending inward from an outer end, an enlarged bore extending longitudinally from an inner end thereof to the tool engaging bore, one or more tool engaging segments formed by a plurality of longitudinal slits extending from the outer end of the inner member along the tool engaging diameter and along the enlarged diameter a distance terminating short of an inner end thereof, the segments biased outward forming an enlarged tool engaging bore, the segments including a tapered outer end, said outer member comprising a threaded bore extending along the inner end thereof to threadingly engage the quill threaded portion, a tapered bore at the outer end thereof complementary to the tapered end, whereby longitudinal movement of the inner member toward the outer end engages the tapered outer end of the segments with the tapered bore biasing the segments to a tool engaging diameter to fixedly engage a shank of a tool;

a cross-pin slidingly engaging the inner member and the transverse slot extending radially past the outer diameter a distance;

a spring seat comprising an inner diameter slidingly engaging the quill outer diameter, a pair of radially opposed slots along an outer end thereof to nestingly receive the cross-pin, an outer diameter enveloping the cross-pin, an inner end engaging an outer end of a spring;

said spring slidingly enveloping the quill outer diameter, an inner end thereof abutting an outer face of the raised diameter shoulder, and the outer end thereof biased against said spring seat; and the spring seat abutting the cross-pin whereby the spring biasing force is transmitted to the inner member biasing the tapered end longitudinally outward against the tapered bore, and biasing the segments and the engaging diameter radially inward to engage the shank of the tool.

2. The quick change tool holder as defined in claim 1 further comprising:

an outer sleeve rotatable relative to the housing for engaging and disengaging the tool and collect comprising a threaded outer diameter along the outer end of the housing, a threaded bore along the inner end of the sleeve threadingly engaging the housing threaded diameter, a sleeve central bore terminating in a sleeve shoulder near an outer end of the sleeve, a sleeve through bore exceeding an outer diameter of the collet outer member;

a thrust bearing including a stationary race and a rotatable race slidingly supported by the quill outer diameter, interposed between the cross-pin and the sleeve shoulder;

wherein rotation of the sleeve in a first direction engages the sleeve shoulder with the stationary race moving the thrust bearing longitudinally inward abutting the rotating race with the pin compressing the spring and allowing a longitudinally inward movement of the tubular member of the segments and the tool engaging diameter to release the tool;and wherein rotation of the sleeve in a second direction disengages the sleeve shoulder from the thrust bearing allowing the spring force to urge the pin, the tube, and the inner member longitudinally outward, urging the segments and the tool engaging diameter radially inward to engage the tool.

* * * * *